J. WILLMANN.
ICE CREAM FREEZER.
APPLICATION FILED FEB. 13, 1908.
969,016.
Patented Aug. 30, 1910.
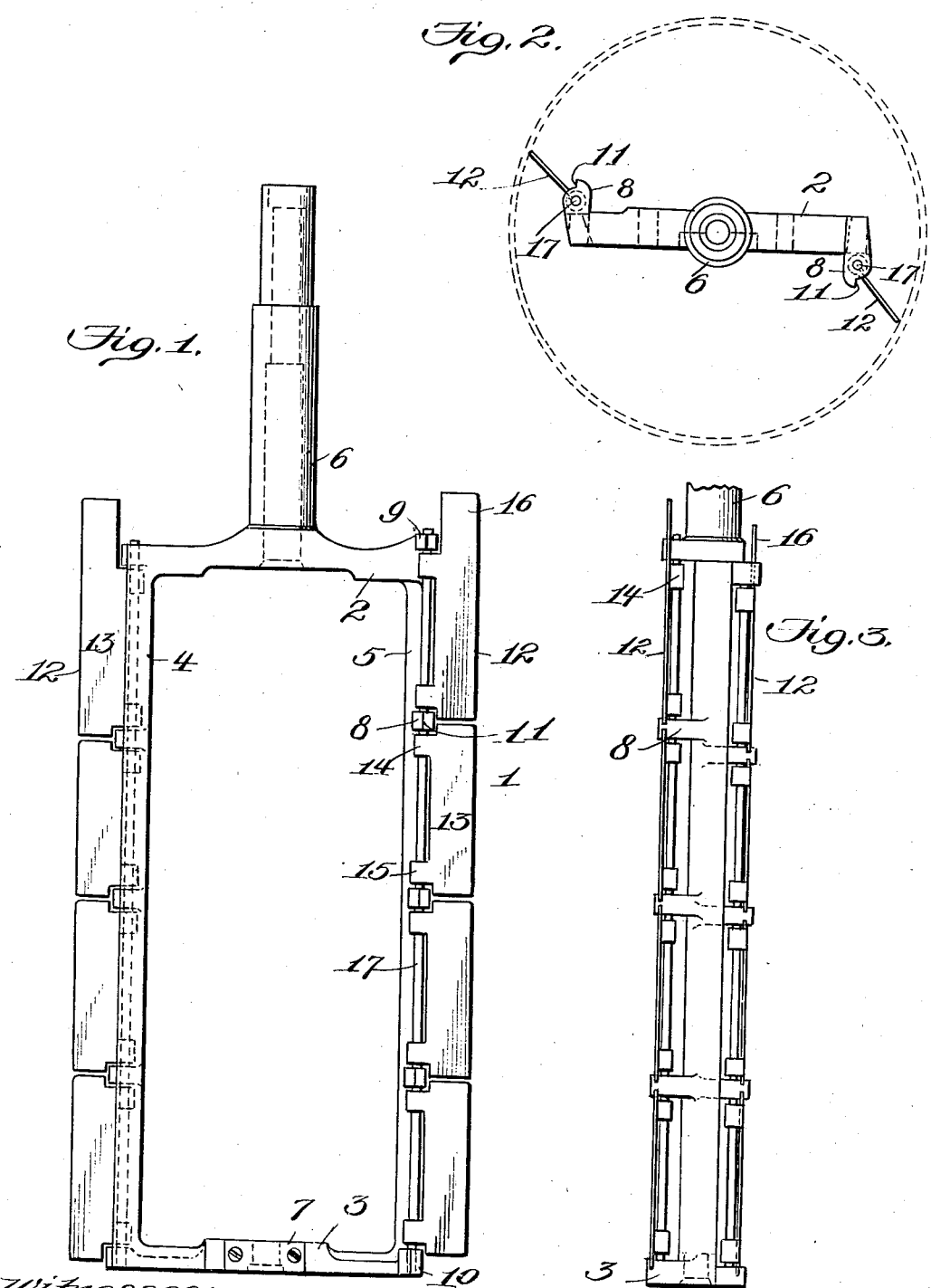
Witnesses:
Inventor
Joseph Willmann
By James L. Norris
Atty.

UNITED STATES PATENT OFFICE.

JOSEPH WILLMANN, OF SHELTON, CONNECTICUT.

ICE-CREAM FREEZER.

969,016.　　　　　Specification of Letters Patent.　　Patented Aug. 30, 1910.

Application filed February 13, 1908.　Serial No. 415,769.

*To all whom it may concern:*

Be it known that I, JOSEPH WILLMANN, a subject of the Emperor of Germany, residing at Shelton, in the county of Fairfield and State of Connecticut, have invented new and useful Improvements in Ice-Cream Freezers, of which the following is a specification.

This invention relates to ice cream freezers, and has for its object to provide scraping means in a manner as hereinafter set forth for keeping the inner face of the freezing can or receptacle free of the mixture from which the ice cream is made during the manufacture of the ice cream, thereby reducing to a material extent the time required for the freezing operation.

In an ordinary ice cream freezer, as is well known, the process of freezing cream is to place a mixture of cream, sugar and extract into a can or receptacle which is cooled either by means of brine coming from a refrigerating machine or with a mixture of salt and ice. The low temperature of the brine which is necessary for freezing the cream will of course freeze the ice cream mixture to the inner face of the can or receptacle and under such conditions it is necessary to provide means to scrape or clean the inner face of the can or receptacle clear of the mixture or otherwise the portion of the mixture adhering to the inner face of the can or receptacle would act as an insulator or insulation and retard or prevent the freezing of the cream.

The means heretofore employed for cleaning the inner face of the can or receptacle clear of the mixture was what may be termed a scraper of a length equal to the height of the can or receptacle; but in apparatus for freezing cream the can or receptacle in many cases is not perfectly true and under such conditions the scraper will touch but a portion of the cylinder, consequently cleaning that part which it touches and not the remaining portion. Under such circumstances an insulation would be formed upon the inner face of the can body or receptacle, thereby retarding the freezing operation. To overcome this retardation of the freezing operation is the prime object of this invention and to attain the object a scraper is set up formed of a plurality of pivoted independent sections, the scraper sections being so disposed that one will act independently of the other and scrape only a short space of the inner face of the can or receptacle, but at the same time engaging during the freezing operation the inner face of the cylinder throughout, consequently preventing the mixture acting as an insulation and thereby materially reducing the time necessary for the freezing operation.

Further objects of the invention are to provide a sectional scraper for ice cream freezers which shall be simple in its construction and arrangement, strong, durable, efficient in its use, readily set up and comparatively inexpensive to manufacture.

With the foregoing and other objects in view, the invention consists in the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In the accompanying drawings, wherein like reference characters denote corresponding parts throughout the several views—Figure 1 is a front elevation of a pair of sectional scrapers in accordance with this invention, the sections of the scrapers being connected to a carrying frame; Fig. 2 is a plan view, showing the adaptation of scrapers in accordance with this invention in connection with the freezing can or receptacle; Fig. 3 is a side elevation.

Referring to the drawings in detail, 1 denotes a scraper-carrying frame comprising a top bar 2, a bottom bar 3 and side bars 4, 5. Formed integral with the top bar 2 is a vertically-extending arm 6 which is apertured to allow of the extending therethrough of the beater or dasher shaft (not shown). The bottom bar 3 is provided with a bearing 7 for the lower end of the beater or dasher shaft. Each of the bars 4, 5 is provided throughout its length with a series of apertured lugs 8 which are suitably spaced apart. These lugs project at right angles with respect to the side bars of the scraper frame, the lugs upon the side bar 4 extending in an opposite direction with respect to the lugs 8 upon the side bar 5. The top bar 2 of the scraper frame is formed at each end with a lug 9, which are in alinement with the lugs 8 the lug 9 at one end of the top bar 2 extending in an opposite direction with respect to the lug 9 upon the other end of said top bar. The bottom bar 3 of the scraper frame is formed at each end with a lug 10 arranged in vertical alinement with the lugs 8. The lug 10 at one end of the bottom bar 3 extends in an opposite direction with respect to the lug 10 upon the other end of said bar. The lugs 8, 9 and 10 are provided with shoulders 11 constituting stops for the sections of the scrapers.

The frame 1 at each side carries a scraping means, each consisting of a plurality of sections or scraper blades 12 arranged in vertical alinement and one independent of the other. Each of the sections or scraper blades comprises a rectangular body portion 13 having a pair of inwardly-extending ears 14, 15 positioned in alinement with respect to the lugs 8, 9 and 10. The ears 14 are positioned below the plane of the top edge of the body portion 13 and the ears 15 are positioned above the plane of the bottom edge of the body portion 13. The sections or scraper blades are of the same length, with the exception of the upper section or scraper blade, the length of the same being such as to project above the top bar 2 of the scraper frame as indicated at 16. The ears 14, 15 are apertured, and extending through the said ears 14, 15, as well as the lugs 8, 9 and 10 are the rods 17 which constitute means for pivotally connecting the sections or scraper blades 12 to the side bars of the frame 1.

The ears 14, 15 of each section or scraper blade 12 are so disposed with respect to the body portion 13 that the upper and lower ends of the said body portion will overlap the lugs so that the sections or blades will at times engage the stops 11 in order that the shifting movement of the sections or blades 12 in one direction will be limited.

The movement of each section or blade 12 is independent of the other as will be evident owing to the manner in which they are set up and from such arrangement they can clean the freezing can or receptacle easily on the surface corresponding to their length and owing to the fact that the sections or blades have an independent movement, provision is made for cleaning the can or receptacle if the inner surface thereof is irregular or bulges at one portion, as, owing to each section or blade having an independent movement, compensation is made for irregular inner surfaces of the inner face of the can body or receptacle.

It is well known that the main difficulty in the operation of ice cream freezers has been the impossibility of rapidly freezing the cream. This retardation of the operation was caused because the freezing surfaces of the cans or receptacles could not be scrupulously cleaned during the freezing operation, due to the faulty construction of the scrapers, the scrapers generally employed being of a length equal to the height of the can body, but by setting up the scrapers in accordance with this invention, provision is made whereby the freezing surface of the can or receptacle can be cleaned in such a manner as to overcome the objection heretofore existing and under such conditions the freezing operation of the cream is vastly facilitated.

What I claim is—

1. In an ice cream freezer, the combination of a can, a scraper frame revoluble within said can and carrying a plurality of superposed independently movable scraper blades arranged to coöperate with the inner surface of the can, and a pintle connected at intervals in its length to said scraper frame and having said blades pivotally mounted thereon.

2. In a freezer, the combination of a can, a scraper frame revolubly mounted therein and having a central opening to receive a beater or dasher, a pintle carried by and attached at intervals to said frame and extending parallel to the axis of rotation of such frame, and a plurality of independently movable scraper blades all mounted upon and turnable about said pintle as a common axis.

3. In an ice cream freezer, the combination of a can, a scraper frame revoluble within said can and provided at each vertical edge with a plurality of axially spaced lugs having alined apertures, a pintle passing through the alined apertures of said lugs on the scraper frame, and a plurality of superposed independently movable scraper blades pivotally mounted on said pintle as a common axis, the lugs on said frame intervening between adjacent scraper blades.

In testimony whereof I have hereunto set my hand in presence of two subscribing witnesses.

JOSEPH WILLMANN.

Witnesses:
ROSEMARY MEEHAN,
LULU C. HINE.